W. S. THOMPSON.
POWER TRANSMISSION MECHANISM.
APPLICATION FILED JUNE 10, 1916.
1,274,627.
Patented Aug. 6, 1918.
3 SHEETS—SHEET 3.
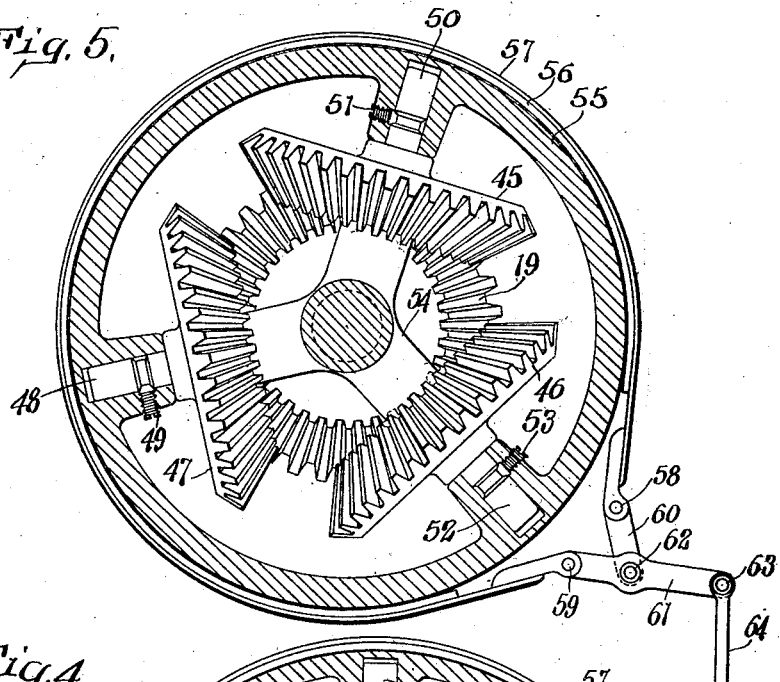
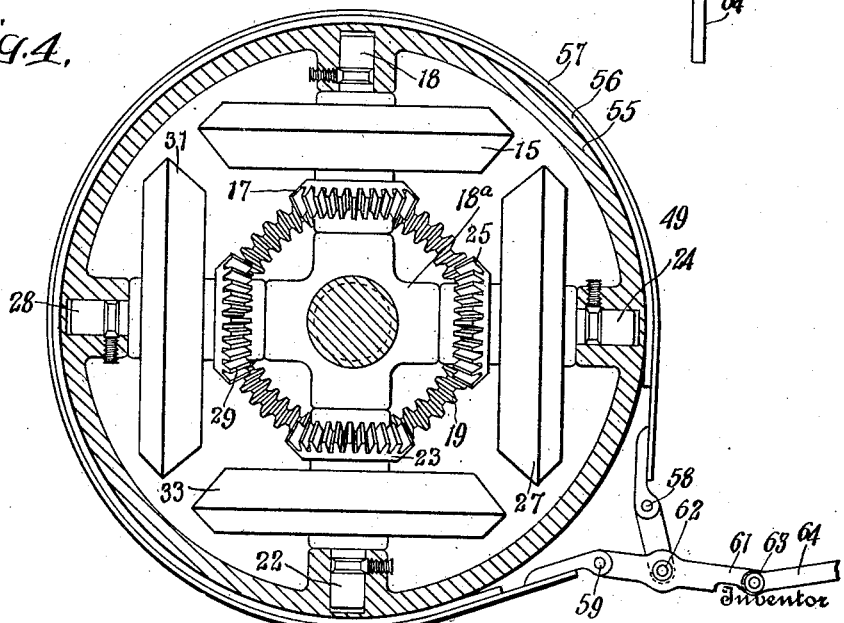
William S. Thompson,

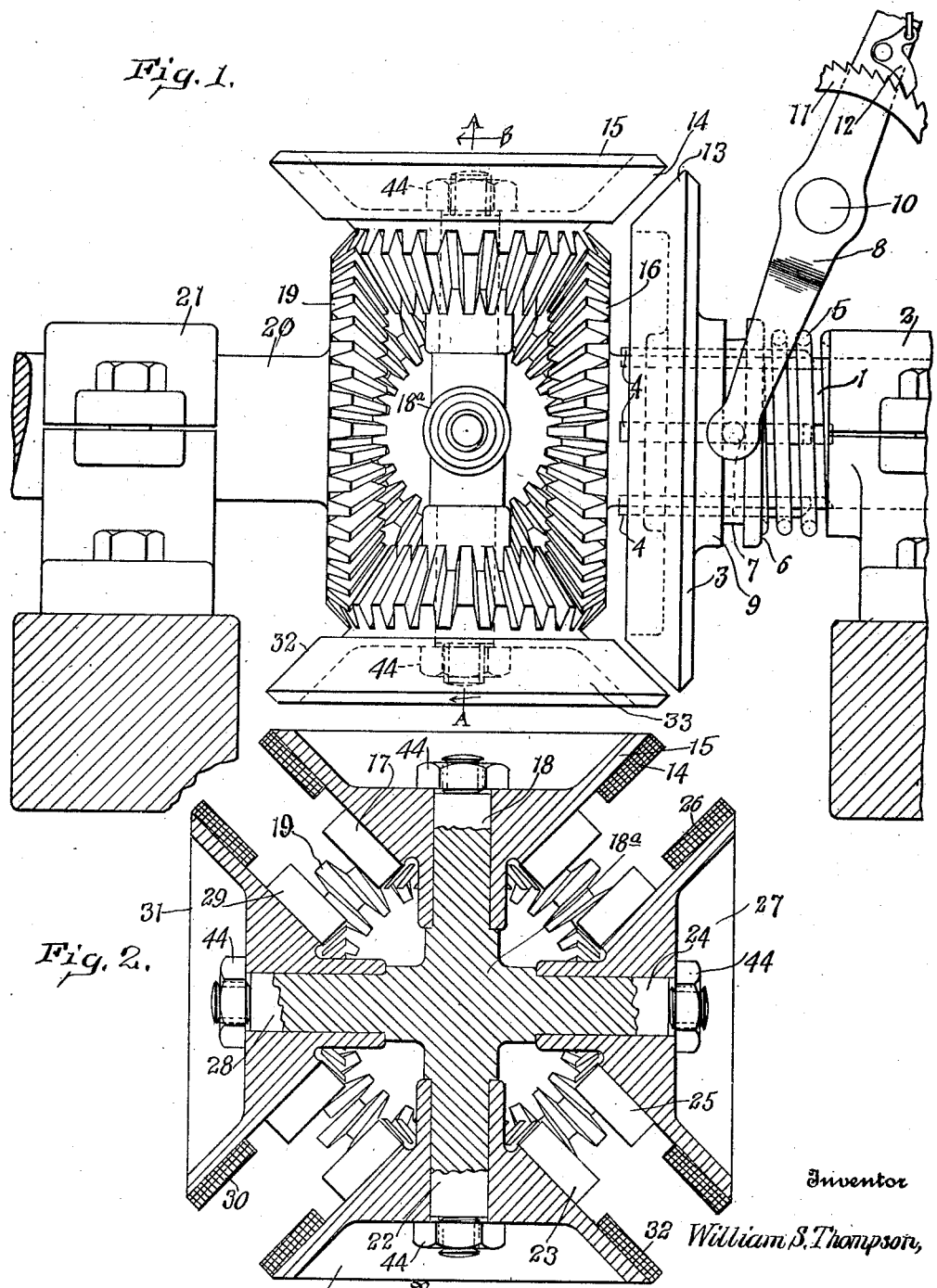

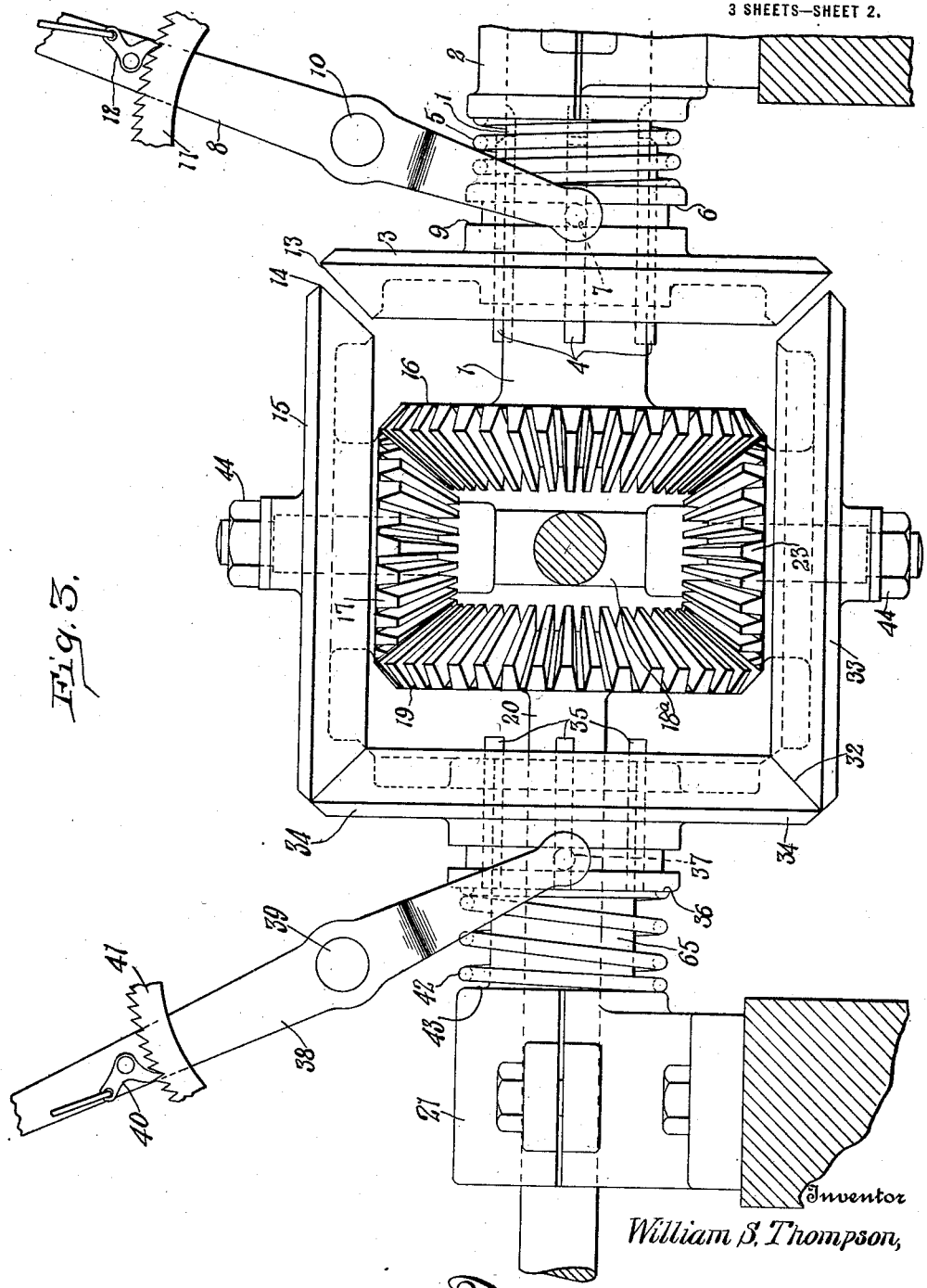

UNITED STATES PATENT OFFICE.

WILLIAM S. THOMPSON, OF LEIPSIC, OHIO.

POWER-TRANSMISSION MECHANISM.

1,274,627.  Specification of Letters Patent.  Patented Aug. 6, 1918.

Application filed June 10, 1916. Serial No. 102,979.

*To all whom it may concern:*

Be it known that I, WILLIAM S. THOMPSON, a citizen of the United States, residing at Leipsic, in the county of Putnam and State of Ohio, have invented certain new and useful Improvements in Power-Transmission Mechanism, of which the following is a specification, reference being had therein to the accompanying drawing.

This invention relates to power transmission mechanism and has for its object to provide a transmission giving forward and reverse speeds, together with the ability to reduce the forward speed as desired. These different speeds are each thrown in or made operative gradually and without strain, the operation being accomplished by moving friction members into and out of contact with each other, these friction members serving to drive positive gearing.

The invention is usable in many relations and as one illustration its adaptation to the operation of machine tools may be referred to. Many such tools may to advantage be brought rapidly up to the work and then moved slowly through the working range. The tool must then be reversed and this reverse as it does not accomplish any work may be quite rapid. In the use of the present invention the working or slow forward speed may be made very small by permitting more or less slipping of the friction members and the ratio of the reversing mechanism is such that a quick return may be made.

A particular object is to provide a transmission mechanism in which the gears remain permanently in mesh and the shifting to cause the different speeds is done by friction members which control these gears. Thus, the shifting may take place gradually and without strain to the mechanism.

Referring to the drawings,

Figure 1 shows a side elevation of mechanism adapted to give a forward or an idling movement.

Fig. 2 is a sectional view on the line A A of Fig. 1, looking in the direction of the arrow.

Fig. 3 is a view similar to Fig. 1, but with the addition of the reduced speed forward mechanism. The figure also shows a different speed ratio from that found in Fig. 1.

Fig. 4 is a section centrally through the transmission system showing the adaptation of a reverse mechanism thereto; and Fig. 5 is a modification showing three planetary gears instead of four, the planetary gears being the same size as the central gears.

A driving shaft 1 is carried in a bearing 2 and splined thereto is a friction member 3 turning with the shaft 1, but movable upon it longitudinally. The splines 4 serve to compel this movement and a spring 5 surrounds the driving shaft 1 between the bearing 2 and a shoulder 6 on the friction member 3 serving to force the friction member into operative position. A lever 8 is pivoted at the point 10 and is provided with pins 7 engaging a groove between abutments 6 and 9 in the friction member 3. A ratchet 11 mounted in any desired manner may be engaged by a pawl 12 carried on the lever 8 so as to hold the lever against movement by the spring 5.

Carried fast by the driving shaft 1 is a large gear 16 adapted to drive the entire mechanism.

The driven shaft 20 is mounted in a bearing 21 and has fast thereon a large gear 19. As shown in Fig. 1, the gears 19 and 16 are the same size.

Between the gears 16 and 19 a spider 18$^a$ is mounted for rotation, this spider carrying, as shown in Fig. 2 four planetary gears 17, 25, 23 and 29. These all mesh continually with both gears 16 and 19 and each is mounted on an arm 18, 24, 22 or 28 to the spider 18$^a$ being held thereon by nuts 44. Fast to each of these planetary gears is a friction member 15 having a beveled driving surface 14. These numerals refer to the friction member at the top of Fig. 2, the other members being respectively given numerals 27, 33 and 31 for the friction members and 26, 32 and 30 for the beveled surfaces.

It will be obvious that the four planetary gears and their supporting devices are precisely alike and the succeeding description will refer only to the friction member 15 and the planetary gear 17 at the top of the figure.

With the construction shown in Fig. 1 the constant movement of shaft 1 may permit the shaft 20 to remain idle or may drive it at an equal speed. In the position of the figure the planetary gear mechanism is idling simply, the gear 17 being rotated around its shaft 18 and also being revolved around the line between shafts 1 and 20.

It may be here noted that the term "rotate" will be used to describe movement of gear 17 or friction member 15 upon its axis 18 and the term "revolve" or "revolution" will be applied to movement of this gear and friction member around the line joining shaft 20 to shaft 1.

To cause movement of shaft 20 the lever 8 is moved to the right at its upper end, thus forcing friction member 3 into contact with member 15.

In this figure the ratio of gear 17 to gears 16 or 19 is as two to three and the ratio of friction member 15 to member 3 is as three to four. Therefore, the frictional engagement of members 3 and 15 will lock the gears 16 and 17 together and compel the mechanism to rotate as a unit. Obviously, if the ratio of gears 17 and 16 was the same as that of friction members 15 and 3 this would not be true as it would then operate as a simple planetary gearing. But with any other ratio than the equal one just referred to no movement between friction members 3 and 15 is possible and therefore the entire system is compelled to move as a unit. Thus, the shaft 20 will be rotated at an equal velocity with shaft 1.

Referring now to Fig. 3 the parts previously referred to in connection with Fig. 1 need not be again described. This figure shows the addition of a slow forward speed mechanism and shows a different gearing ratio between the gears 16 and 17 and the friction members 3 and 15. Here the friction members are of equal size and the gear 17 is half the size of the gear 16.

Surrounding the driven shaft 20 is an additional friction member 34 similar in size to the members 3 and 15. It is carried on rods 35 which prevent its rotation at all times. However, a lever 38 pivoted at 39 is provided with pins 37 riding in an abutment 36 of the friction member 34 and a spring 42 surrounding shaft 20 between the edge 43 of bearing 21 and the abutment 36 tends to force the friction member 34 into contact with the friction member 15. As was the case with the lever 8 a ratchet 41 may be engaged by a pawl 40 to hold the friction member 34 out of operative position.

In Fig. 3 the parts are shown in position to cause the slow forward movement of shaft 20. The operation of lever 38 permits the friction member 34 to be moved into contact with member 15. As the member 34 is non-rotatable on the shaft 20 this causes both a rotation and a revolution of friction member 15 and gear 17. Of course, in this relation of parts the lever 8 is moved to withdraw the friction member 3.

Assuming that shaft 1 is being driven at a constant velocity, the revolution of gear 16 fast thereto tends to cause both rotation and revolution of intermediate gear 17. If friction member 34 was not engaged with member 15 no movement of gear 19 would be caused, but inasmuch as revolution of gear 17 tends to advance the gear 19 in the same direction, while rotation of gear 17 tends to retard gear 19, the actual movement of this gear and consequently of driven shaft 20 is less than that of the driving shaft 1. The extent of speed reduction depends on the ratios between the gears 17 and 16 or 19 and between the friction members 15 and 34. In order that this may be clear the following mathematical discussion will be given so as to explain the method of calculating the ratio between the gears and the friction members to produce any desired speed reduction.

Assume (as is shown) that gears 16 and 19 have equal diameters and let $a$ = circumference of friction member 34.
$b$ = circumference of friction member 15.
$c$ = number of teeth in planet gear 17.
$d$ = number of teeth in gear 19 (or 16).
$e$ = number of R. P. M. of gear 16.
$x$ = number of rotations of gear 17 (or member 15).
$y$ = number of revolutions of gear 17 (or member 15).

Then $$ay - bx = 0, \text{ or } y = \frac{b}{a}x \quad (1)$$

because the point of member 15 in contact with member 34 is stationary.

Also, the number of teeth of gear 16 passing any point is $d$ times $e$ and thus $$cx + dy = de \quad (2)$$

because each revolution of gear 17 advances it past $d$ teeth of gear 16 and each rotation of gear 17 advances its right hand side past $c$ teeth of gear 16.

Substituting in (2) the value of $y$ found in (1) we have $$x = \frac{adc}{ac + bd} \quad (3)$$

and $$y = \frac{bdc}{ac + bd} \quad (4)$$

Now if $z$ = the number of R. P. M. of gear 19 we have $$dy - cx = dz \quad (5)$$

because each revolution of gear 17 tends to advance gear 19 by $d$ teeth, and each rotation of gear 17 tends to retard gear 19 by $c$ teeth. The difference is equal to the velocity of gear 19 multiplied by the number of its teeth.

From $$(5)\ z = \frac{dy - cx}{d}$$

and, substituting the values of $x$ and $y$ from (3) and (4), we have, finally, $$z = e\left(\frac{bd - ac}{bd + ac}\right)\ (6)$$

That is, the ratio of the velocity of gear 19 to gear 16 is $$\frac{bd - ac}{bd + ac}.$$

In Fig. 3, $a = b$ and $d = 2c$. Thus the value of $z$ is one-third of $e$, or a speed ratio of one to three. In Fig. 1, $3a = 4b$ and $2d = 3c$. Thus the value of $z$ is one-seventeenth of $e$, or a speed ratio of one to seventeen.

It will be readily seen that by varying the ratios of the gears 17 and 19 and of the members 15 and 34, any desired speed reduction may be obtained, and, of course, the pitch diameter of the gears may be employed in the formula instead of the numbers of teeth. As an example, to obtain a speed ratio of two to five, we may have $a = 10$, $b = 10$, $c = 3$ and $d = 7$ for the ratios of diameters of the parts 34, 15, 17 and 19, respectively. The formula (6) also shows that by properly proportioning the four parts just mentioned the value of $z$ may be very small or even may be made essentially negative, that is, that gear 19 may move reversely relative to gear 16. In addition, the proof assumed the equality of gears 16 and 19. These may be of different sizes, and then a multiplier equal to the ratio of such sizes will be introduced into formula (6), giving an additional number of possible speed reductions.

Referring now to Figs. 4 and 5 the reversing mechanism is there shown. The principle of it is that the revolution of the planetary gear 17 and friction member 15 is prevented but their rotation permitted. This obviously serves to move the driven shaft 20 oppositely to the driving shaft 1 and at the same velocity provided the gears 16 and 19 are of the same size as they are shown in Figs. 1 and 3.

To accomplish the reversing a brake band 57 is passed around the casing supporting the planetary gears and friction members, the band having a lining 56 which frictionally engages the brake drum 55. The ends of the band 57 are attached at points 58 and 59 to levers 60 and 61 which are fast together on a pin 62. An operating lever 64 is connected to lever 61 by a pin 63 and the operation of the brake band will be obvious. When it is tightened revolution of the brake drum 55 is prevented and therefore the planetary gear 17 is prevented from revolving, but its rotation is permitted and a reversal of the direction of movement of driven shaft 20 is obtained. In Fig. 5 the only difference is that the planetary gears 45, 46 and 47 are of the same size as the gear 19. They are mounted on a spider 54, the ends 50 of which are held fast to the brake drum 55 by screws 51, 53 and 49.

It will be seen that the construction is well adapted to carry out the objects first stated. It is compact and the three levers 8, 38 and 64 may be conveniently placed for operation. The mechanism may give a forward movement to shaft 20 at a speed as compared with shaft 1, depending on the relative sizes of gears 16 and 19. It may also give a reversing movement to shaft 20 at the same relative velocity compared to shaft 1 or it may give a slow forward movement to the shaft 20, depending on the ratios of gears 17 and 19 and friction members 15 and 34.

In all three of the types of movement the engagement of the friction members occurs gradually and therefore without strain to the parts. In addition the engagement of the friction member 34 with the member 15 may be such as to permit more or less slipping of member 15 and therefore may provide an indefinite number of speed reductions, each greater than the reduction when friction member 34 is fully pressed against member 15.

Having thus fully described my invention, what I claim as new and desire to secure by Letters Patent, is:—

1. A driving shaft, friction members, a differential, a driven shaft, one friction member connected to said driving shaft, another to said differential and a third member mounted about but not connected to the driven shaft, whereby the speed of the driven shaft is reduced as compared to the speed of the driving shaft when the member about the driven shaft is in engagement with the member on the differential and the member on the driving shaft is out of engagement with the differential friction member.

2. A driving shaft, a driven shaft, a bearing for the respective shafts, friction members, a differential, one friction member connected to the differential, another member mounted on the driven shaft bearing, whereby when the friction members are in engagement, the speed of the driven shaft is reduced as compared to the speed of the driving shaft.

3. A driving shaft, a driven shaft, differential gearing, friction members traveling with said differential gearing, one friction member adapted to travel with said driving shaft, and another friction member adapted to travel on the driven shaft, means for stopping the rotation of said members and the differential gearing in their rotation around a longitudinal axis running through the driving shaft and the driven shaft, whereby the direction of motion of the driven shaft is reversed as compared with the direction of motion of the driving shaft.

4. A driving shaft, friction members, differential gearing, a driven shaft, and a band brake disposed about the friction member at right angles to the driving shaft and the driven shaft, whereby the direction of movement of the driven shaft is reversed as compared with that of the driving shaft.

5. A driving shaft, a driven shaft, a gear and a friction member on each of said shafts, differential gearing and differential friction members between and connecting said first gearing and friction members, and means for preventing revolution of said differential gearing and differential friction members around the axis of the driving and the driven shafts.

6. A driving shaft, friction members, differential gearing, one friction member connected to said shaft and the other friction member connected with the differential gearing, and a driven shaft.

7. A driving shaft, friction members, differential gearing, one friction member connected to said shaft, the other members to said differential gearing, a driven shaft, whereby the driving shaft and the driven shaft turn at the same speed in a direct drive, when the friction members are in positive engagement with one another.

8. A driving shaft, friction members differential gearing, one friction member connected to said shaft, the other members to said differential gearing, a driven shaft, whereby the driving shaft revolves, but the driven shaft does not move when the friction members are disengaged.

9. A driving shaft, a driven shaft, differential gearing, two major gears of the differential gearing fastened to the driving shaft and the driven shaft, respectively, minor gears of the differential gearing, spider arms to which said gears are connected, friction members, one member turning upon each arm of the spider and fixedly connected to the minor gear turning on that arm of the spider, another member mounted upon the driving shaft, adapted to move with it, and to move in and out of engagement with the other friction members by a longitudinal movement of said driving shaft.

10. A driving shaft, a driven shaft, differential gearing, two major bevel gears of the differential gearing fastened to the driving shaft and the driven shaft, respectively, four minor gears of the differential gearing one-half the size of a major gear, minor gears, spider arms to which said minor gears are connected, friction members, one member turning upon each arm of the spider and fixedly connected to the minor gear turning on that arm of the spider, another member mounted upon the driving shaft and adapted to move in and out of engagement with the other friction members by a longitudinal movement on such driving shaft and keyed thereto.

11. A driving shaft, a driven shaft, differential gearing, two major bevel gears of the differential gearing fastened to the driving shaft and the driven shaft, respectively, four minor gears of the differential gearing one-half the size of a major gear, minor gears, spider arms to which said minor gears are connected, friction members, one member turning upon each arm of the spider and fixedly connected to the minor gear turning on that arm of the spider, another member mounted upon the driving shaft and normally spring pressed into engagement with the other members, and means of moving said friction member mounted on the driving shaft out of engagement.

12. A driving shaft, a driven shaft, differential gearing, two major gears of the differential gearing fastened to the driving shaft and the driven shaft, respectively, minor gears of the differential gearing, spider arms to which said gears are connected, cone friction members, one member turning upon each arm of the spider and fixedly connected to the minor gear turning on that arm of the spider, another member mounted upon the driving shaft and adapted to move in and out of engagement with the other members by a longitudinal movement on said driving shaft to which it is keyed.

13. A driving shaft, a driven shaft, bearings adapted to support the driving and driven shafts, respectively, friction members, a differential composed of a major gear on the driving shaft and on the driven shaft, respectively, a spider upon each arm of which turns a minor gear of said differential between said major gears, one friction member mounted on the driving shaft and adapted to travel with and longitudinally upon said shaft, another member mounted on an extension of the bearing adapted to support the driven shaft, said member so mounted adapted to travel longitudinally upon said extension of the bearing, means for advancing or withdrawing said friction member on the driving shaft, means for advancing or withdrawing said friction member on the extension of the bearing, a friction member mounted upon each of said spider arms and fixedly connected to the respective minor gear mounted on each of said arms, whereby, when the friction member on the driving shaft is drawn out of engagement and the friction member on the bearing of the driven shaft is let in engagement with the friction members traveling on the arms of the spider, the speed of the driven shaft is reduced as compared with the speed of the driving shaft.

14. A driving shaft, a driven shaft, bearings adapted to support the driving and driven shafts, respectively, friction members, a differential composed of a major gear on the driving shaft and driven shaft, respectively, a spider upon each arm of which turns a minor gear of said differential between said major gears and in mesh therewith, one member mounted on an extension of the bearing adapted to support the driven shaft, said member adapted to travel longitudinally upon said shaft, means for advancing or withdrawing said members on the driven shaft from engagement with the other members, each one of which is respectively mounted upon an arm of said spider and fixedly connected to the respective minor gear mounted on each of said arms, whereby, when the member on the driving shaft is let into engagement with the members on each of said arms of the spider, the speed of the driven shaft is reduced as compared with the speed of the driving shaft.

15. A driving shaft, a driven shaft, bearings adapted to support said shafts, friction members, a differential composed of a major bevel gear on the driving shaft and driven shaft, respectively, a spider upon each arm of which turns a minor bevel gear of said differential between said major bevel gears, one member mounted on an extension of the bearing adapted to support the driven shaft, said member adapted to travel longitudinally upon said shaft, means for advancing or withdrawing said friction member, mounted on the extension of the bearing of the driven shaft, from engagement with the other members, each one of which is respectively mounted upon an arm of said spider and fixedly connected to the respective minor bevel gear mounted on each of said arms, whereby, when the friction member on the extension of the bearing of the driving shaft is let into engagement with the friction members on each of said arms of the spider, the speed of the driven shaft is reduced as compared with the speed of the driving shaft.

16. A driving shaft, a driven shaft, bearings adapted to carry said shafts, friction members, a differential composed of a major gear on the driving and driven shafts, respectively, a spider upon each arm of which turns a minor gear of said differential and one-half the size of said major gears and in mesh with said major gears between them, one friction member mounted upon an extension of the bearing adapted to carry the driven shaft, other friction members of the same size as the first-mentioned member each mounted on an arm of said spider and fixedly connected with the respective minor gear mounted on each of said arms of said spider, whereby, when the member on the extension of the bearing of the driven shaft is let into rolling engagement with the members carried by the spider, the speed of the driven shaft is reduced as compared with the speed of the driving shaft.

17. A driving shaft, a driven shaft, bearings in which said shafts respectively turn, friction members, a differential composed of a major gear on the driving and driven shafts, respectively, a three arm spider upon each arm of which turns a minor gear of said differential of the same size as the major gear and in mesh with said major gears between them, one friction member mounted on an extension of the bearing of the driven shaft and adapted to travel longitudinally upon it, means of moving said member in and out of engagement with the other friction members, each of which is mounted upon the respective arm of said spider and fixedly connected to the minor gear carried by each arm of said spider, whereby, when the friction member on the driven shaft is in engagement with the friction members carried by the respective arms of the spider, the speed of the driven shaft is reduced as compared with the speed of the driving shaft.

18. A driving shaft, differential gearing, a driven shaft, two major gears fixedly connected to the driving shaft and driven shaft, respectively, minor gears of said differential disposed between the major gears, a spider, each of the arms of said spider carrying a minor gear upon which arm said minor gear freely turns, a band brake, the drum member of said brake being carried on the ends of said spider arms, the band member of said brake suitably disposed about said drum member and adapted to engage therewith, means for bringing said band member into engagement with said drum member and releasing it therefrom, whereby said spider is brought to rest when the members of the brake are in positive engagement and the direction of motion of the driven shaft is reversed from that of the driving shaft.

19. A driving shaft, a differential gearing, a driven shaft, two major gears fixedly connected to said driving shaft and driven shaft, respectively, three minor gears of said differential gearing of the same size as the major gears and in mesh with said major gears between them, a spider, each of the arms of said spider carrying a minor gear upon which arm said minor gear freely turns, a band brake, the drum member of said brake being carried on the ends of said spider arms, the band member of said brake suitably disposed about said drum member and adapted to engage therewith, means for bringing said band member into engagement with said drum member and releasing it therefrom, whereby said spider is brought to rest when the members of the brake are in positive engagement and the direction of motion of the driven shaft is reversed from that of the driving shaft.

20. A driving shaft, differential gearing, a driven shaft, two major gears fixedly connected to the driving shaft and driven shaft, respectively, four minor gears of said differential of one-half the size of the major gears and meshing with said major gears between them, a spider, each of the arms of said spider carrying a minor gear, upon which arm said minor gear freely turns, a band brake, the drum member of said brake being carried on the ends of said spider arms, the band member of said brake suitably disposed about said drum member and adapted to engage therewith, means for bringing said band member into engagement with said drum member and releasing it therefrom, whereby said spider is brought to rest when the members of the brake are in positive engagement and the direction of motion of the driven shaft is reversed from that of the driving shaft.

In testimony whereof I affix my signature.

WILLIAM S. THOMPSON.

Copies of this patent may be obtained for five cents each, by addressing the "Commissioner of Patents, Washington, D. C."